(12) United States Patent
Philippoz et al.

(10) Patent No.: US 6,727,324 B2
(45) Date of Patent: Apr. 27, 2004

(54) CALCIUM REACTANTS IN BLENDS CONTAINING COPOLYETHER ESTER ELASTOMERS AND ETHYLENE(METH) ACRYLATE/UNSATURATED EPOXIDE COPOLYMERS

(75) Inventors: Jean-Michel Philippoz, Prangins (CH); Olaf Norbert Kirchner, Wilmington, DE (US); Kathy Lynn Fortmann, Werl-Hilbeck (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/198,425

(22) Filed: Jul. 18, 2002

(65) Prior Publication Data

US 2003/0008141 A1 Jan. 9, 2003

Related U.S. Application Data

(63) Continuation of application No. 09/648,979, filed on Aug. 28, 2000, now abandoned.

(51) Int. Cl.[7] .............................................. C08L 67/02
(52) U.S. Cl. ........................ 525/437; 428/35.7; 525/444
(58) Field of Search ................. 525/444, 437; 428/35.7

(56) References Cited

U.S. PATENT DOCUMENTS

| 4,010,222 A | 3/1977 | Shih | 525/176 |
|---|---|---|---|
| 4,912,167 A | 3/1990 | Deyrup et al. | 525/166 |
| 5,059,638 A | 10/1991 | Wissmann | 523/205 |
| 5,098,953 A | 3/1992 | Ohmae et al. | 525/176 |
| 5,128,404 A | 7/1992 | Howe | 524/456 |
| 5,208,292 A | 5/1993 | Hert et al. | 525/166 |
| 5,260,387 A | 11/1993 | Boundy et al. | 524/444 |
| 5,407,999 A | 4/1995 | Hert et al. | 525/166 |
| 5,523,135 A | 6/1996 | Shiwaku et al. | 428/35.7 |
| 6,312,824 B1 * | 11/2001 | Philippoz et al. | 428/480 |

FOREIGN PATENT DOCUMENTS

| CA | 2039132 A1 | 7/1992 |
|---|---|---|
| EP | 577 508 A1 | 1/1994 |
| EP | 0904320 B1 | 8/2001 |
| JP | 6-29362 | 9/1980 |
| JP | 59-58051 | 4/1984 |

* cited by examiner

Primary Examiner—Sandra M. Nolan

(57) ABSTRACT

Compositions that are particularly well-suited for blow molding are made from blends containing (A) two copolyether ester elastomers that include acid end-groups, (B) an ethylene copolymer that includes at least one unsaturated epoxide group and acrylate and/or (meth)acrylate groups, at least one of (C) or (D) wherein (C) is an ethylene copolymer having acrylate and/or methacrylate groups and at least one anhydride of an unsaturated carboxylic acid and (D) is a rubbery polymer that can be finely dispersed and (E) a calcium compound capable of reacting with the acid end-groups of (A), preferably calcium oxide or calcium hydroxide.

10 Claims, No Drawings

CALCIUM REACTANTS IN BLENDS CONTAINING COPOLYETHER ESTER ELASTOMERS AND ETHYLENE(METH) ACRYLATE/UNSATURATED EPOXIDE COPOLYMERS

CROSS-REFERENCE TO RELATED APPLICATIONS

This application is a continuation of U.S. application Ser. No. 09/648,979, filed Aug. 28, 2000, now abandoned.

BACKGROUND OF THE INVENTION

1. Field of the Invention

The invention relates to moldable resin compositions and molded articles obtained therefrom.

The invention relates in particular to blow moldable resin compositions based on polyether ester elastomers or block copolymers in which rubber like polyether soft segments and plastic like hard segments are alternately linked to one another.

2. Description of the Related Art

The blow molding of polyesters in particular polyether ester elastomers is known, but remains problematic especially for the blow molding of very long parts which requires specific rheological properties, in particular a closely controlled high melt strength to avoid unwanted sagging.

U.S. Pat. No. 4,010,222 reports that the addition of a copolymer containing polymerized ethylene units and polymerized carboxylic acid units to a copolyester elastomer improves its processing by blow molding.

U.S. Pat. No. 4,912,167 describes a blow moldable composition of a polyester such as polybutylene terephthalate (PBT), polyethylene terephthalate (PET) or a PBT/PET blend, an epoxide polymer and a source of catalytic ions.

U.S. Pat. No. 5,128,404 describes a blow moldable composition containing polybutylene terephthalate, an ethylene copolymer containing epoxide groups and an ionomer obtained by partially neutralizing with $Na^+$ of $K^+$ the carboxyl groups of an ethylene copolymer containing (meth) acrylic acid.

U.S. Pat. No. 5,523,135 describes the problems of blow molding thermoplastic polyester resins, and reports an improvement for a combination of a thermoplastic polyester resin, typically, PBT, with a styrenic copolymer. In Comparative Example 12 it reports that blow molding was impossible when the PBT was replaced with a PBT-containing polyester ether elastomer.

EP-A-0,577,508 aimed to improve the blow moldability of polyether ester elastomers (block copolymers) which hitherto were not considered suitable for blow molding, by mixing them with an epoxy compound and a phenol alkali metal salt.

Canadian Patent Application 2,039,132 proposed a general improvement in polyether ester elastomers (block copolymers) by mixing them with an aromatic thermoplastic polyester, like PBT, PET or blends thereof, a rubbery interpolymer and optionally a mineral filler.

Whereas certain polyether ester elastomer formulations have been successfully used for blow molding, it still remains problematic to provide a blow moldable resin composition based on polyether ester resin that has a high parison stability, with little tendency to sag, for the blow molding of very long parts, especially for sequential co-extrusion or 3-D parison manipulation techniques.

SUMMARY OF THE INVENTION

According to the invention a moldable resin composition with improved properties for blow molding comprises the following components (A)–(F).

(A) A blend of two polyether ester elastomers (A1) and (A2), (A1) with a hardness in the range 45–72 Shore D, in an amount 70–95 wt. % of the blend, and (A2) with a hardness in the range 25–40 Shore D, in an amount 5–30 wt. % of the blend.

(B) A copolymer comprising from 94 to 50 wt. % of ethylene, from 5 to 35 wt. % of at least one alkyl or cycloalkyl acrylate or methacrylate, in which the alkyl or cycloalkyl group has from 2 to 10 carbon atoms, and from 1 to 15 wt. % of at least one unsaturated epoxide.

At least one of (C) and (D), where (C) is a copolymer comprising from 88 to 60 wt. % of ethylene, from 11.5 to 40 wt. % of at least one alkyl or cycloalkyl acrylate or methacrylate, in which the alkyl or cycloalkyl group has from 2 to 10 carbon atoms, and from 0.5 to 6 wt. % of at least one anhydride of an unsaturated dicarboxylic acid; and (D) is at least one rubbery polymer that can be finely dispersed into the composition by extrusion.

(E) A calcium compound capable of reacting with acid end-groups of the polyether ester resins of blend (A).

(F) One or more optional additives.

In the composition according to the invention: the resin blend (A) is present in an amount of 60–90 wt. % of the composition. Copolymer (B) is present in an amount of 6–15 wt. % of the resin blend A. Copolymer (C) when present is in an amount up to 20 wt. % of the composition, and the rubbery polymer (D) when present is in an amount up to 20 wt. % of the composition, providing the sum of (C) and (D) is at least 2 wt. % of the composition. The calcium compound (E) is in an amount such as to provide up to 2 wt. % elemental calcium in the composition. Lastly, the optional additive(s) (F) when present is/are in an amount up to 20 wt. % of the composition.

The composition according to the invention provides a high parison stability, with little tendency to sag, enabling the successful blow molding of very long parts, which could not be achieved with prior polyether ester elastomer formulations, at the same time combining a good surface aspect of the molded part. This composition is especially advantageous for sequential co-extrusion and for 3-D parison manipulation techniques.

The copolyester elastomers (A) are advantageously copolyetheresters consisting essentially of a multiplicity of recurring long chain ester units and short chain ester units joined head-to-tail through ester linkages. The long chain ester units are represented by the formula

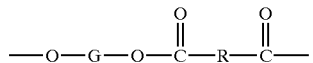

and the short chain ester units are represented by the formula

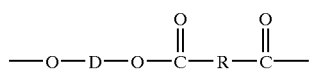

where G is a divalent radical remaining after removal of terminal hydroxyl groups from a poly(alkylene oxide) glycol having a molecular weight of about 400–6000 and a carbonto-oxygen ratio of about 2.0–4.3; R is a divalent radical remaining after removal of carboxyl groups from a dicarboxylic acid having a molecular weight less than about 300 and D is a divalent radical remaining after removal of hydroxyl groups from a diol having a molecular weight less than about 250; provided said short chain ester units amount to about 15–95% by weight of the copolyetherester.

Alternatively, the copolyester elastomer is a copolyester ester.

Copolyetherester elastomers and copolyester ester elastomers are described for example in U.S. Pat. Nos. 4,981,908, 5,824,421 and 5,731,380, the descriptions whereof are incorporated herein by way of reference.

Polyetherester block copolymers and their preparation are also described in Encyclopedia of Polymer Science and Engineering, Volume 12, pages 76–177 (1985) and the references reported therein.

Various polyetherester block copolymers are commercially available from a number of companies under various tradenames, for example HYTREL of E. I. du Pont de Nemours, RITEFLEX of Ticona and ARNITEL of DSM.

Varying the ratio hard/soft segment and using different alkylene oxides and molar weights of the soft segments makes it possible to obtain block copolyesters having different hardnesses, for example between Shore D 25 and 80. The invention employs a blend of two polyether ester elastomers, one with a hardness in the range 45–72 Shore D, and the other with a hardness in the range 25–40 Shore D.

The employment of a blend of copolyester elastomers of high and low hardnesses is critical for the invention and gives benefit for the parison aspect (less melt fracture). Moreover, the blend used in the invention has been found to improve the surface aspect of the parison when coming out of the die, leading to less surface defects in the molded part.

Using a blend of copolyester elastomers of high and low hardnesses is not equivalent to using a single copolyester elastomer of median properties. This is because the length of the soft blocks in the copolyester elastomer tends to be longer for the softer grades, hence the presence of even a small fraction of long soft blocks can influence the crystallisation speed and density of entanglement retained when the material solidifies from the molten state.

Preferably the soft segments in the soft copolyester elastomer is polytetramethyleneglycol (PTMEG) with a molecular weight of the order of 2000, whereas the soft segment in the hard copolyester elastomer is PTMEG with a molecular weight of the order of 1000.

The relative amounts of the hard and soft copolyester elastomers are in the range 75–97 wt. %, preferably 84–94 wt. %, for the hard copolyester elastomer and 3-25 wt. %, preferably 6–16 wt. %, for the soft copolyester elastomer, based on the total weight of the blend.

Examples of alkyl acrylates and methacrylates that may in particular be employed as constituents of the copolymers (B) and (C) are: methyl methacrylate, ethyl acrylate, n-butyl acrylate, isobutyl acrylate and 2-ethyl-hexyl acrylate.

Examples of unsaturated epoxides that may in particular be employed as constituents of copolymer (B) are: aliphatic glycidyl esters and ethers such as allyl glycidyl ether, vinyl glycidyl ether, glycidyl maleate and itaconate and glycidyl acrylate and methylacrylate; and alicylic glycidyl esters and ethers such as 2-cyclohexene-1-glycidyl ether, diglycidyl 4,5-cyclohexene-dicarboxylate, glycidyl 4-cyclohexene carboxylate, glycidyl 5-norbornene-2-methyl-2-carboxylate and diglycidyl endocdis-bicyclo(2.2.1)-5-heptene-2,3-dicarboxylate.

Examples of anhydrides of an usaturated dicarboxylic acid that can be employed as constituents of copolymer (C) are maleic anhydride, itaconic anhydride, citraconic anhydride and tetrahydrophthalic anhydride.

Further examples of copolymers (B) and (C) are given in U.S. Pat. Nos. 5,208,292 and 5,407,999. These patents describe thermoplastic polyester alloys usable particularly for injection molding of articles strengthened against impact, comprising a saturated polyester like PET or PBT reinforced with a copolymer. This reinforcing polymer includes a first copolymer comprising from 94 to 60 wt. % of ethylene, from 5 to 25 wt. % of at least one alkyl or cycloalkyl acrylate or methacrylate, in which the alkyl or cycloalkyl group has from 2 to 10 carbon atoms, and from 1 to 15 wt. % of at least one unsaturated epoxide from 84 to 60 wt. % of ethylene; a second copolymer comprising from 15 to 34 wt. % of at least one alkyl or cycloalkyl acrylate or methacrylate, in which the alkyl or cycloalkyl group has from 2 to 10 carbon atoms and from 1 to 6 wt. % of at least one anhydride of an unsaturated dicarboxylic acid; and a compound capable of accelerating the reaction between the epoxy group of the first copolymer and the anhydride group of the second copolymer.

Rubbery polymers which can be included in the composition of the present invention as component (D) include acrylate terpolymer rubbers as described in U.S. Pat. No. 5,380,785, such as those available from Goodyear Chemical under the trademark SUNIGUM, styrene-ethylene/butylene-styrene block copolymers such as those available from Shell Chemical Company under the tradename KRATON, and methacrylate/butadiene/styrene or butyl-acrylate/PMMA multiphase composite interpolymers such as those available from Rohm & Haas Co under the tradename PARALOID.

Examples of methacrylate/butadiene/styrene multiphase interpolymers of component (D) are those available from Atofina under the tradename METABLEN and those available from Sonepa Polymer Additives under the tradename of RAJALOID.

Further examples of component (D) are styrene-ethylene/butylene-styrene block copolymers available from Teknor Apex under the tradename TEKRON and those available from Multibase under the tradename MULTIFLEX.

Examples of the calcium compound (E) capable of reacting with acid groups of the polyether ester resins of blend (A) are: calcium oxide, calcium hydroxide, calcium salts of inorganic acids and calcium salts of mono-, di- or polycarboxylic acids. The presence of this calcium compound is important because it provides enhanced viscosity at a given level of the copolymers (B) and (C), hence enables a high viscosity to be obtained while avoiding problems associated with an excessive amount of copolymers (B) and (C). Furthermore, in order to keep the amount of this calcium compound to a minimum value in the composition, it is an advantage that the weight fraction of calcium in the calcium compound is high, which means for instance that calcium oxide or calcium hydroxide are preferred over calcium stearate.

The composition according to the invention may contain the usual additives, for example stabilizers, ultraviolet ray-absorbers, hydrolytic stabilizers, anti-static agents, dyes or pigments, fillers, fire-retardants, lubricants, processing aids, for example release agents, etc, in an optional amount. These additives may for example be included in either component of the polyetherester block copolymer blend.

The optional additives can include a compound capable of accelerating the reaction between the epoxy groups present in the copolymer (B) and the acid end-groups of the copolyester elastomer, for example a zinc compound in an amount of up to about 1.5 wt. % of the composition.

The composition according to the invention is useful in particular in blow molding processes but can also be used in other molding processes such as extrusion molding and generally any manufacturing method that includes the step of heating the composition above its melting temperature. The invention also pertains to shaped articles made using the given composition, in particular blow molded articles, especially long parts.

DETAILED DESCRIPTION

The invention will be further described and compared with prior art in the following Examples and Comparative Examples.

The compositions discussed below were prepared by mixing the components in the described proportions and melt blending the resulting mixtures on a 40 mm diameter twin screw extruder. Extrusion conditions were as follows: temperature profile of the extruder: decreasing from 250° C. at the hopper to 230° at the die; die temperature: 230° C.; screw speed: 300 rpm. Measured melt temperatures range from 240° C. to 275° C. for the various compositions. The extrudate was pulled into strands, cooled in a water bath and pelletized.

Description of the Measurement Methods

The melt flow rate of the materials was measured according to ISO 1133 at 230° C.; loads from 2.16 kg to 21.6 kg were used, to accommodate for the wide range of melt viscosities observed.

The blow molding evaluations were done on a Battenfeld Fischer machine equipped with a screw having 60 mm diameter and 20 L/D length. Barrel and die temperatures were set in a way that the melt temperature measured with a hand probe is 230+/−2° C. With the screw turning at a constant speed of 31 rpm, the parison is extruded through a circular die with an outer diameter of 23.8 mm and a core pin diameter of 18.4 mm. During its descent from the die towards the floor, the advance of the parison is measured in the following way: the parison is cut at the die exit and this defines the time as zero, then the time is recorded when the lowest point of the parison has moved by 1 dm, repeatedly up to 12 dm. Four such measurements are made and averaged. The average times are used to extract the sag length, which is defined as the length at which the parison speed is twice its speed measured between 1 and 2 dm. The sag length can be obtained either by direct inspection of the data, or by fitting an appropriate equation through the raw data and calculating this length from the derivative of the fitted equation. A higher value of the sag length indicates that the material has less tendency to sag under its own weight, which translates into better suitability for the production of long parts by the blow molding process. This is especially important for blow molding techniques that involve parison manipulation and/or sequential extrusion of different materials.

Being a measurement of viscosity, the melt flow rate was sometimes taken as a first screening indicator of the behavior of a material in the blow molding process. There is a strong correlation between low MFR values (high viscosity) and high sag length values in blow molding. Hence, the blow molding evaluation was not done for all cases, especially at the early stages and for the materials which did not seem promising based on the MFR value.

Additional criteria were used to qualify the blow molding behavior of the resins. In particular the parison and the finished part were visually observed to detect the presence of melt fracture (shark skin) or of inhomogeneities, undispersed material, gel-like particles or lumps. Emission of smoke or volatile compounds leading to objectionable odors were also monitored during the blow molding process.

Description of Ingredients

Materials used in the Examples set forth below are as follows, identified by the respective trademarks and trade designations:

TEEE 1: HYTREL 5556, a thermoplastic polyester elastomer from E. I. du Pont de Nemours having a Shore D Hardness of 55 and a melt flow rate of 7.5 dg/min at 220° C. under 2.16 kg load.

TEEE 2: HYTREL 5586, a thermoplastic polyester elastomer from E. I. du Pont de Nemours having a Shore D Hardness of 55 and a melt flow rate of 4.5 dg/min at 220° C. under 2.16 kg load.

TEEE 3: HYTREL 3078, a thermoplastic polyester elastomer from E. I. du Pont de Nemours having a Shore D Hardness of 30 and a melt flow rate of 5 dg/min at 190° C. under 2.16 kg load.

TEEE 4: HYTREL HTR4275 BK316, a thermoplastic polyester elastomer from E. I. du Pont de Nemours having a Shore D Hardness of 55 and a melt flow rate of 1.5 dg/min at 230° C. under 5 kg load. This particular resin grade is widely used and considered as a benchmark in the blow molding of technical components in thermoplastic polyester elastomers.

Terpolymer 1: a terpolymer of ethylene/28% n-butyl acrylate/5.2% glycidyl methacrylate having a melt flow rate of 12 dg/min at 190° C. under 2.16 kg load, commercially available as ELVALOY AM from E. I. du Pont de Nemours.

Terpolymer 2: a terpolymer of ethylene/25% methyl acrylate/6.5% glycidyl methacrylate having a melt flow rate of 6 dg/min at 190° C. under 2.16 kg load, commercially available as LOTADER AX8900 from Atofina.

Terpolymer 3: a terpolymer of ethylene/30% ethyl acrylate/2% maleic anhydride methacrylate having a melt flow rate of 7 dg/min at 190° C. under 2.16 kg load, commercially available as LOTADER 4700 from Atofina.

Rubber 1: an acrylate terpolymer having a Shore A hardness of 53, commercially available as SUNIGUM P7395 from Goodyear Chemical.

Rubber 2: a butyl acrylate/PMMA core-shell modifier, commercially available as PARALOID) EXL 2314 from Rohm & Haas Co.

Black masterbatch: a masterbatch of carbon black in polyether ester elastomer, commercially available as HYTREL 41CB from E. I. du Pont de Nemours.

Screening Experiments

Compositions were prepared using eight different epoxy compounds incorporated one by one in TEEE1 (A1), in presence of calcium oxide and zinc stearate. It appeared clearly that the Terpolymers 1 and 2 were most efficient to increase the viscosity of the composition, resulting in MFR values as low as 0.1 dg/min at 230° C. under 2.16 kg load. In contrast, epoxy bisphenol condensation products, such as EPON 1004F from Shell, yielded compositions with a viscosity equal or close to the viscosity of the initial TEEE 1 (above 20 dg/min at 230° C./2.16 kg). Intermediate results were obtained with a polyglycidyl ether of ortho-cresol novolac, commercially available as EPON 164 from Shell Chemicals, and with a mixture of 70–82% terephthalic acid diglycidylester and 18–30% trimellitic acid triglycidylester, commercially available as ARALDITE PT910 from Ciba Specialty Chemicals.

A second series of screening experiments was done, where the variables were the concentrations of Terpolymer 2 (4–15%), Terpolymer 3 (0–15%), calcium oxide (0–1%), black masterbatch (3–10%), and TEEE 2 (59–93%, adjusted to a total of 100% for each composition). It was found that the dominant factor controlling viscosity is the concentration of the Terpolymer 2: addition of 15% Terpolymer 2 increases the viscosity so much that it becomes essentially impossible to process the resulting material, whereas addition of 4% Terpolymer 2 increases the viscosity to MFR values comprised between 0.8 and 5.3 dg/min at 230° C. under 5 kg load. These experiments also demonstrated clearly that, all other parameters being equal, the presence of calcium oxide increases the viscosity, whereas the amount of black masterbatch has no significant influence on viscosity.

COMPARATIVE EXAMPLES 1 TO 5

The compositions of Comparative Examples 2 to 5 in Table 1 were prepared by extrusion as described above; in addition to the ingredients listed there, they each also contained 1% calcium oxide (component E), 2% black masterbatch and 1.9% stabilisers. Blow molding evaluation of Comparative Examples 1 to 5 was done on the Battenfeld Fischer machine using the above procedure, and the sag length was measured by reading directly from the raw data.

It is found that the sag length is more sensitive to the concentration of Terpolymer 2 than to that of Terpolymer 3. Furthermore, melt fracture is clearly visible when the concentration of Terpolymer 2 is 10%. Compared to the behaviour of the benchmark material TEEE 4, the Comparative Examples 2 to 4 show some improvement of sag length, whereas Comparative Example 5 which has much longer sag length is hampered by a severe melt fracture, leading to unacceptable aspect of finished parts.

TABLE 1

| Component | Ingredients | CE 1 | CE 2 | CE 3 | CE 4 | CE 5 |
|---|---|---|---|---|---|---|
| A1 | TEEE 2 [%] |  | 87.1 | 85.1 | 85.1 | 85.1 |
|  | TEEE 4 [%] | 100 |  |  |  |  |
| B | Terpolymer 2 [%] | — | 6 | 6 | 8 | 10 |
| C | Terpolymer 3 [%] | — | 2 | 4 | 2 |  |
|  | Ratio B/A [%] |  | 6.9 | 7.1 | 9.4 | 11.8 |
|  | Sag length [dm] | 4.5 | 5 | 6 | 7 | 10.5 |
|  | Parison aspect | Good | Good | Good | Good | Melt fracture |

Note:
Comparative Examples 2 to 5 also contained 1% calcium oxide (component E), 2% black masterbatch and 1.9% stabilisers.

EXAMPLES 1 TO 6 AND COMPARATIVE EXAMPLES 6 AND 7

The compositions of Examples 1 to 6 and Comparative Examples 6 and 7 in Table 2 were prepared by extrusion as described above; in addition to the ingredients listed there, they also each contained 1% calcium oxide (component E), 2% black masterbatch, 0.4% zinc stearate and 1.4% stabilizers. Blow molding evaluation was done on the Battenfeld Fischer machine, and the sag length was calculated from the equation fitted through the raw data.

TABLE 2

| Component | Ingredient | Ex 1 | Ex 2 | Ex 3 | Ex 4 | Ex 5 | Ex 6 | CE 6 | CE 7 |
|---|---|---|---|---|---|---|---|---|---|
| A1 | TEEE 1 [%] | 49.2 | 49.2 | 57.2 | 65.2 |  |  |  |  |
| A1 | TEEE 2 [%] |  |  |  |  | 57.2 | 57.2 | 75.2 | 65.2 |
| A2 | TEEE 3 [%] | 10 | 10 | 10 | 10 | 10 | 10 | 10 | 20 |
| B | Terpolymer 2 [%] | 8 | 8 | 8 | 10 | 8 | 8 | 10 | 10 |
| C | Terpolymer 3 [%] | 8 | 8 |  | 10 |  |  |  |  |
| D | Rubber 1 [%] |  | 20 | 20 |  | 20 |  |  |  |
| D | Rubber 2 [%] | 20 |  |  |  |  | 20 |  |  |
|  | Ratio B/A [%] | 13.5 | 13.5 | 11.9 | 13.3 | 11.9 | 11.9 | 11.7 | 11.7 |
|  | Sag length [dm] | 42 | 21 | 19 | 12 | 22 | 33 | (a) | (a) |

Examples 1 to 6 and Comparative Examples 7 and 8 contained also 1% calcium oxide (component E), 2% black masterbatch, 0.4% zinc stearate and 1.4% stabilisers.
(a) The composition could not be extruded because of its too high viscosity.

No melt fracture was observed in any of the Examples 1 to 6. This shows that presence of the softer components TEEE 3 and/or rubber strongly reduces the tendency for the parison to show melt fracture. Very high sag length values are found with a fair parison aspect; some lumps or gel-like particles were observed with all examples, and some smoke was evolved with examples 1, 2, 3 and 5, but these defects are minor and cosmetic rather than functional.

Comparative Examples 6 and 7 show that although Terpolymer 3 and rubber are each optional, there must be at least one of these in the composition.

EXAMPLES 7 TO 25 AND COMPARATIVE EXAMPLE 8

A design of experiments was done, where the compositions are as described in Table 3. All compositions in this Table also contained 2% black masterbatch, 1% calcium oxide (component E), 0.4% zinc stearate and 1.4% stabilizers.

All examples in Table 3 have high viscosity, as shown by the MFR values measured at 230° C. under 21.6 kg load. Comparative Example 8 shows that when the amount of Terolymer 2 is higher than 15% of the amount of blend A, then the composition becomes too viscous to be extruded. This finding is in agreement, and indeed more strict, than the observation done with the second series of screening experiments, where compositions using Terpolymer 2 at 15% of the total composition (i.e. 18 to 25% relative to TEEE 2) were too viscous to be processed. It can also be seen that all Examples comply with this upper limit of 15% component B relative to the blend A.

The Examples 7 to 25 also all show much improved sag length relative to the benchmark TEEE 4 (Comparative Example 1, Table 1). Indeed some compositions of Table 3 have extremely high melt strength, with essentially no sagging over the measurement height of 1.2 m (almost no curvature of the parison length versus time graph, sag length calculated as high as 50 dm).

The surface aspect of the parts was estimated globally, based on presence of melt fracture, lumps, pits/craters and other aspect defects. The best surface aspect with no visible surface defects, which was obtained with the benchmark material TEEE 4 (Comparative Example 1), reached the score of 10 on this scale. Materials within Examples 7 to 25 exhibit surface aspect of parison and finished parts ranging from rather poor (e.g. Ex. 19) to very good (e.g. Ex. 7).

The Examples have been given to illustrate but not to limit the invention. Depending on the desired pattern of characteristics, persons skilled in the art will be able to select from the range of possible compositions exemplified here the optimal combination between processing behavior and aspect of the parison and finished parts.

present in an amount of 6–15 wt. % of the blend A; copolymer (C) when present is in an amount up to 20 wt. % of the composition, and component (D) when present is in an amount up to 20 wt. % of the composition, providing the sum of (C) and (D) is at least 2 wt. % of the composition; the calcium compound (E) is in an amount such as to provide up to 2 wt. % elemental calcium in the composition; and the optional additive(s) (F) when present is/are in an amount up to 20 wt. % of the composition.

TABLE 3

| Component | Ingredient | Ex 7 | Ex 8 | Ex 9 | Ex 10 | Ex 11 | Ex 12 | Ex 13 | Ex 14 | Ex 15 | Ex 16 | Ex 17 |
|---|---|---|---|---|---|---|---|---|---|---|---|---|
| A1 | TEEE 1 [%] | 74.2 | 59.2 | 76.2 | 72.2 | 69.2 | 65.2 | 65.2 | 69.2 | 63.2 | 67.2 | 75.2 |
| A2 | TEEE 3 [%] | 4 | 10 | 7 | 7 | 4 | 4 | 10 | 10 | 8 | 8 | 4 |
| B | Terpolymer 2 [%] | 6 | 8 | 6 | 8 | 6 | 8 | 10 | 8 | 8 | 8 | 8 |
| C | Terpolymer 3 [%] | 6 | 8 | 6 | 8 | 6 | 8 | 10 | 8 | 8 | 8 | 8 |
| D | Rubber 1 [%] | | 10 | | | 10 | | | | 8 | | |
| D | Rubber 2 [%] | 5 | | | | | 10 | | | | 4 | |
| | Ratio B/A [%] | 7.7 | 11.6 | 7.2 | 10.1 | 8.2 | 11.6 | 13.3 | 10.1 | 11.2 | 10.6 | 10.1 |
| | Sag length [dm] | 8 | 16 | 10 | 26 | 11 | 50 | 31 | 19 | 17 | 30 | 28 |
| | Aspect (a) | 9 | 8 | 8 | 6 | 7 | 7 | 7 | 7 | 8 | 4 | 5 |
| | MFR (b) [dg/mm] | 12.1 | 3.3 | 6.1 | 1.2 | 4.6 | 1.9 | 0.3 | 0.9 | 2.1 | 0.4 | 0.8 |

| Component | Ingredient | Ex 18 | Ex 19 | Ex 20 | Ex 21 | Ex 22 | Ex 23 | Ex 24 | Ex 25 | CE 8 |
|---|---|---|---|---|---|---|---|---|---|---|
| A1 | TEEE 1 [%] | 65.6 | 73.2 | 69.1 | 79.2 | 63.2 | 71.2 | 76 | 68.2 | 61.2 |
| A2 | TEEE 3 [%] | 5.6 | 10 | 3.6 | 4 | 10 | 7 | 3.2 | 9 | 4 |
| B | Terpolymer 2 [%] | 8 | 6 | 9 | 6 | 6 | 6 | 8 | 9 | 10 |
| C | Terpolymer 3 [%] | 8 | 6 | 9 | 6 | 6 | 6 | 8 | 9 | 10 |
| D | Rubber 1 [%] | | | | 4.5 | | 5 | | | 10 |
| D | Rubber 2 [%] | 8 | | | | 10 | | | | |
| | Ratio B/A [%] | 11.2 | 7.2 | 12.4 | 7.2 | 8.2 | 7.7 | 10.1 | 11.7 | 15.3 |
| | Sag length [dm] | 41 | 10 | 34 | 11 | 22 | 11 | 25 | 20 | (c) |
| | Aspect (a) | 6 | 1 | 7 | 5 | 7 | 8 | 7 | 2 | |
| | MFR (b) [dg/mm] | 0.3 | 5.5 | 0.3 | 4.8 | 1.9 | 6.3 | 0.8 | 0.5 | |

All compositions in this Table also contained 2% black masterbatch, 1% calcium oxide (component E), 0.4% zinc stearate and 1.4% stabilizers.
(a) higher is better
(b) at 230° C./21.6 kg load
(c) resin could not be extruded

What is claimed is:

1. A moldable resin composition comprising:
   (A) a blend of two copolyether ester elastomers having acid end-groups, (A1) and (A2): (A1) with a hardness in the range 45–72 Shore D, in an amount 75–97 wt. % of the blend, and (A2) with a hardness in the range 25–40 Shore D, in an amount 3–25 wt. % of the blend;
   (B) a copolymer comprising from 94 to 50 wt. % of ethylene, from 5 to 35 wt. % of at least one alkyl or cycloalkyl acrylate or methacrylate, in which the alkyl or cycloalkyl group has from 2 to 10 carbon atoms, and from 1 to 15 wt. % of at least one unsaturated epoxide;
   at least one of (C) and (D) where:
      (C) is a copolymer comprising from 88 to 60 wt. % of ethylene, from 11,5 to 40 wt. % of at least one alkyl or cycloalkyl acrylate or methacrylate, in which the alkyl or cycloalkyl group has from 2 to 10 carbon atoms, and from 0.5 to 6 wt. % of at least one anhydride of an unsaturated dicarboxylic acid;
      (D) is at least one rubbery polymer that can be dispersed finely into the composition by extrusion;
   (E) a calcium compound capable of reacting with acid end-groups of the copolyether ester elastomers of blend (A); and
   (F) one or more optional additives;
   wherein the resin blend (A) is present in an amount of 60–90 wt. % of the composition; copolymer (B) is 2. The composition of claim 1 wherein the copolyether ester elastomers (A1) and (A2) consist essentially of a multiplicity of recurring long chain ester units and short chain ester units joined head-to-tail through ester linkages, said long chain ester units being represented by the formula

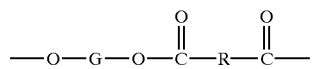

and said short chain ester units being represented by the formula

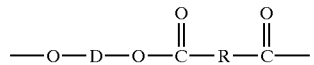

where G is a divalent radical remaining after removal of terminal hydroxyl groups from a poly(alkylene oxide) glycol having a molecular weight of about 400–6000 and a carbon-to-oxygen ratio of about 2.0–4.3; R is a divalent radical remaining after removal of carboxyl groups from a dicarboxylic acid having a molecular weight less than about 300 and D is a divalent radical remaining after removal of hydroxyl groups from a diol having a molecular weight less than about 250; provided said short chain ester units amount to about 15–95% by weight of said copolyether ester.

3. The composition of claim 1, wherein blend (A) contains copolyether ester elastomers (A1) in an amount 84–94 wt. % and (A2) in an amount 6–16 wt. % of the blend.

4. The composition of claim 1, wherein copolymer (B) and copolymer (C), when present, comprise alkyl acrylates and methacrylates selected from: methyl methacrylate, ethyl acrylate, n-butyl acrylate, isobutyl acrylate and 2-ethyl-hexyl acrylate.

5. The composition of claim 1, wherein copolymer (B) comprises unsaturated epoxides selected from: aliphatic glycidyl esters and ethers, and alicylic glycidyl esters and ethers.

6. The composition of claim 1, wherein copolymer (C) comprises anhydrides of an unsaturated dicarboxylic acid selected from maleic anhydride, itaconic anhydride, citraconic anhydride and tetrahydrophthalic anhydride.

7. The composition of claim 1, wherein the rubbery polymer (D) is at least one of an acrylate terpolymer rubber and a butyl-acrylate/PMMA multiphase composite interpolymer.

8. The composition of claim 1, wherein the calcium compound (E) is calcium oxide or calcium hydroxide in an amount up to 2 wt. % of elemental calcium.

9. The composition of claim 1, wherein the optional additives (F) include a compound capable of accelerating the reaction between the epoxy groups present in the copolymer (B) and the acid end-groups of the copolyether ester elastomers (A1) and (A2).

10. A shaped article that includes the composition of claim 1.

* * * * *